Dec. 6, 1960

I. JEPSON 2,962,854

LAWN MOWER

Filed Feb. 15, 1955

INVENTOR.
Ivar Jepson
BY
Mason, Kolehmainen, Rathburn & Wyss
Attys

Dec. 6, 1960  I. JEPSON  2,962,854
LAWN MOWER
Filed Feb. 15, 1955  5 Sheets-Sheet 5

INVENTOR.
Ivar Jepson
BY
Mason, Kolehmainen, Rathburn & Wyss
Attys.

United States Patent Office 2,962,854
Patented Dec. 6, 1960

2,962,854

LAWN MOWER

Ivar Jepson, Oak Park, Ill., assignor to Sunbeam Corporation, Chicago, Ill., a corporation of Illinois Filed Feb. 15, 1955, Ser. No. 488,318

30 Claims. (Cl. 56—25.4)

The present invention relates to lawn mowers, and, more specifically, to power lawn mowers of the type in which a suitable prime mover is associated with the lawn mower to drive the cutting mechanism and also, when desired, to propel the mower over the area to be mowed.

The power lawn mower has come into extensive use only since World War II. Prior to World War II, there were very few power lawn mowers sold. Moreover, at that time practically all homeowners purshased hand-powered mowers. The reason for this was probably the fact that the power lawn mowers prior to World War II were very high in price and were very poorly designed. In addition, it was very easy at that time to get a casual worker or a schoolboy to mow the lawn. This type of labor is no longer available, and the homeowner must do this and many other jobs himself. Since the end of World War II, better power lawn mowers have become available, and they have been extensively advertised, so that, at present, more than a million power lawn mowers are sold each year. The rotary type lawn mower with which the present invention is primarily concerned was not available until after the end of World War II. Since that time this type of lawn mower has become very popular, and, in fact, half of all the power lawn mowers sold today are the rotary type as distinguished from the reel type mower, which was the only power lawn mower available prior to that time. Several factors have contributed to the quick acceptance of the rotary mower, an important one being the poorly engineered reel type mower sold to the public prior to the advent of the rotary type lawn mower. A second factor in the rapid rise of popularity of the rotary mower has been the movement of people to suburban and outlying areas where many times it is desirable to have a mower for cutting high grass and the like, which cannot be done satisfactorily with a reel type lawn mower. A third factor is that leaf mulching attachments are available for rotary type lawn mowers, which has further increased the usefulness and popularity of this type of mower, particularly in areas where there are many trees. There have been substantial improvements made in the rotary type lawn mowers recently built as contrasted with those first put on the market, but prior art rotary type lawn mowers still have numerous shortcomings.

One of the principal objections to all power lawn mowers available on the market in recent years has been the fact that they are much too heavy, and that they lack maneuverability and are hard to handle. Also, many of them are underpowered or are so small in size that the mowing job is slow and difficult. In a great majority of rotary lawn mowers the prime mover, generally an internal combustion engine, was used to drive the cutting blade only and the operator had to push the mower over the area to be mowed. On those few that were self-propelled, there was substantially no speed variation. It will be appreciated that a power lawn mower is likely to be used by a variety of different people. For example, the professional gardener or the owner of a large area wants a lawn mower that can finish the job easily and quickly, and under these circumstances the lawn mower should be capable of operating at a relatively high speed, such as of the order of about three miles per hour. Obviously, the lawn mower will also be used by older people and by women, who may not wish to travel that fast. Also, these lawn mowers must be capable of use in fairly tight places where there may be an excess of shrubbery, trees and other impediments around which the mower must travel. In such case it is desirable to have a much lower speed of operation. This cannot be accomplished with the ordinary internal combustion engine by throttle control, since internal combustion engines are notoriously low in power when the speed of operation is substantially reduced and it is necessary to provide other means to obtain the speed change. Also, lower speeds of operation are generally desirable when the mower is used for mulching leaves or for cutting weeds or heavy grass. It would be desirable, therefore, to provide a lawn mower that has the advantageous features mentioned above of lightness, maneuverability, ease of handling, sufficient power, power that drives the mower over the area to be mowed as well as drives the cutting blade, selective transmission means for giving substantial variations in speed, and the like.

In a copending Jepson application, Serial No. 464,020, filed October 22, 1954, now U.S. Patent No. 2,886,934, and assigned to the same assignee as the instant application, there is disclosed and claimed a reel type power mower in which the principle of freewheeling is employed, in that by mere manipulation of the handle of the mower the power is applied or not applied to drive the mower over the area to be cut. This feature has been found to be unusally desirable and is incorporated in the rotary power mower of the present invention.

Manufacturers of power mowers heretofore have made these mowers in a large variety of sizes, including a size beginning with a sixteen or an eighteen-inch cut, and increasing to cuts substantially over two feet. With the mower of the present invention it is believed that many of the small sizes may be dispensed with, since the only reason for having a very small size mower is to get increased maneuverability and easier handling. If these features can be obtained in a larger size mower, the homeowner will appreciate having the same, and it would be desirable, therefore, to provide a mower which even in a size approaching a two-foot cut gives greater maneuverability and ease of handling then substantially smaller mowers now available on the market.

It will be appreciated that to obtain maximum cutting efficiency with a rotary mower, the blade of the mower should rotate as close to the highest engine speed as possible. High cutting blade speed is automatically maintained when the mower is driven over the area to be cut at a speed of the order of three miles an hour. However, when cutting heavy grass or when mulching leaves, a much heavier load is thrown on the prime mover with a resulting drop in speed and decrease in cutting or mulching efficiency. To maintain such high efficiency under all conditions, selective transmission means are desirable, whereby the high cutting blade speed is retained while causing the forward travel of the mower to be substantially decreased at maximum engine efficiency.

Accordingly, it is an object of the present invention to provide a new and improved rotary type lawn mower.

It is another object of the present invention to provide a power operated lawn mower which is very light and which has great maneuverability and resultant ease of handling.

It is another object of the present invention to provide an improved power operated lawn mower which is also self-propelled and includes improved means for applying the energy of the engine to the propelling means.

It is a further object of the present invention to provide a power operated lawn mower in which the weight thereof is maintained at a minimum without sacrificing quality or durability, and in which, even with a large cut, maneuverability is not impaired.

Still another object of the present invention resides in the provision of a selective transmission between the prime mover and the ground wheels of the power mower whereby at maximum engine speed relatively wide variations in speed of movement over the area in question can be obtained, so that the mower is adaptable for use by a wide variety of people including professional gardeners, older people, women and the like, and wherein low speed forward movement is obtainable for cutting weeds and heavy grass, or mulching leaves, while high speed forward movement is obtainable when desired.

It is a further object of the present invention to provide an improved, self-propelled rotary mower having free-wheeling, whereby the mower can readily be operated as a hand mower as far as movement thereof is concerned, or wherein, by a simple movement of the handle, power may be applied to propel the mower over the area to be mowed.

A still further object of the present invention resides in an improved, power operated rotary lawn mower with simple means for adjusting the height of the cut.

It is another object of the present invention to provide a power operated lawn mower having an improved arrangement of ground supports whereby the mower can be used over relatively uneven surfaces and still perform a satisfactory mowing operation.

Still another object of the present invention resides in a power operated lawn mower which can be readily converted to a leaf mulcher.

Further objects and advantages of the present invention will become apparent as the following description proceeds, and the features of novelty which characterize the invention will be pointed out with particularity in the claims annexed to and forming a part of this application.

For a better understanding of the present invention reference may be had to the accompanying drawings in which:

Fig. 8 is an enlarged view of a portion of Fig. 3, with certain parts cut away;

The lawn mower of the present invention comprises a rotary lawn mower including a carriage or support mounted on suitable ground wheels, a prime mover in the form of an internal combustion engine supported on the carriage with the drive shaft of the prime mover extending in a vertical direction. This drive shaft has the lower end thereof connected to a rotary cutting blade which is driven at the speed of the prime mover. By suitable drive means the motor drive shaft also drives a selective transmission mechanism capable of driving a suitable shaft at several different speeds. This shaft is provided with friction means for engaging the ground wheels to drive the same. Relative movement between the shaft and the ground wheels is obtained by pivotal movement of the handle of the lawn mower about a horizontal axis. A suitable mulching attachment is also provided whereby the lawn mower may be converted to a combined lawn mower and leaf mulcher.

Referring now to the drawings, there is illustrated a lawn mower generally designated at 20, which comprises a carriage 21 including a housing or support 22 suitably supported on ground wheels 23 and 24 and a ground roller 25. Supported on the carriage 21 is a prime mover generally designated at 27 and specifically indicated as an internal combustion engine. For the purpose of guiding the carriage and for other functions to be described hereinafter, there is included a handle assembly generally designated at 28, which handle assembly is pivotally associated in a manner to be described hereinafter with the housing 22 or certain members rigidly connected thereto and the ground wheels 23 and 24.

Figure 1:
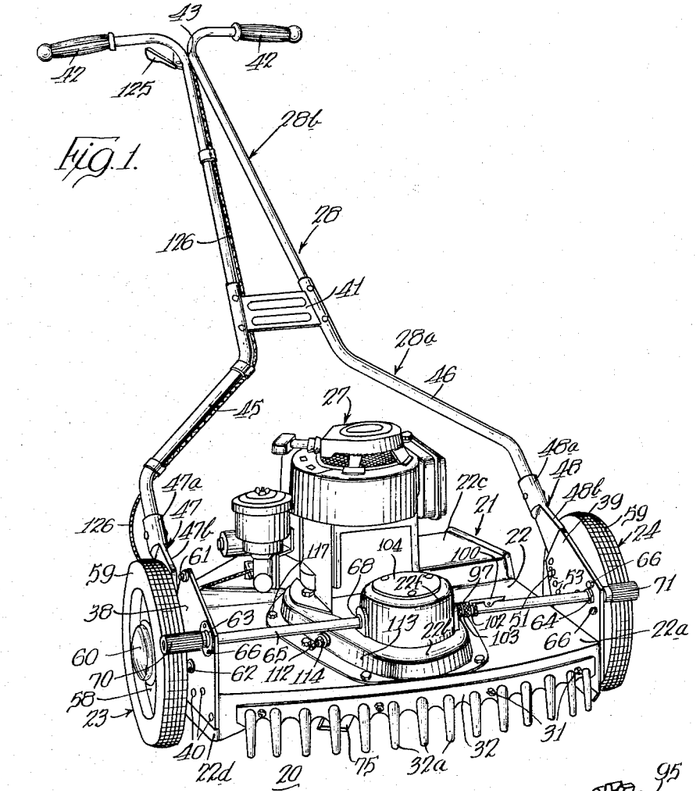
Fig. 1 is a front perspective view of a power operated lawn mower embodying the present invention, with the mower in driving position.

Considering first the carriage 21 (which is effectively the support means or frame of the mower), and specifically the housing 22 forming an important part of the carriage 21, this housing preferably comprises a large casting, preferably of aluminum or other light metal so as to maintain the weight of the mower at a minimum. As illustrated, the housing 22 comprises a large relatively flat area defining the platform 22a, and a raised somewhat elongated, elliptical-shaped flat surface 22b, upon which surface 22b is supported the prime mover 27. The raised area 22b and the large flat area 22a of the housing 22 are readily apparent from Fig. 1 of the drawings. Toward the rear of the housing 22, there is a raised section 22c which defines a sort of exhaust chute to guide the cuttings or mulch in case the device is used as a leaf mulcher through a suitable exhaust opening in the side of housing 22, which opening is generally designated by the reference numeral 29, best shown in Figs. 2 and 5 of the drawings. The housing 22 is provided with a depending skirt 22d around the entire periphery thereof except for the opening 29. This depending skirt 22d is provided on each side of the housing 22 with a notch 30 to accommodate a mulcher attachment described in detail hereinafter. Actually, at the front of the housing 22 the depending skirt designated at 22e depends downwardly only a relatively short distance, since that is the portion of the housing through which the uncut grass or material enters the cutting area of the lawn mower 20.

Preferably, there is removably secured to the abbreviated depending skirt 22e at the front of the lawn mower, as by fastening means 31, a front guard 32, which front guard includes a plurality of depending fingers 32a, between which depending fingers the grass and material to be cut may enter. This front guard 32 will be removed when it is desired to use the mower for mulching leaves and will be replaced by a mulching attachment as described hereinafter. It will be apparent that the front guard 32 prevents foreign objects from getting into the housing 22, where, as will be apparent from the ensuing description, the cutting means is located. At the same time the grass or other material to be cut can readily enter the cutting area within the housing 22 between the depending fingers 32a.

As was indicated above, the housing 22 is supported on suitable means comprising the ground wheels 23 and 24 and the ground roller 25. To accommodate the ground roller 25, there are provided at the rear of the housing 22 a pair of integral, parallel projections 33a and 33b between which the ground roller 25 is disposed. To insure complete maneuverability, the ground roller 25 is relatively short, and in a commercial embodiment built in accordance with the present invention the projections 33a and 33b are spaced a distance of the order of about six inches, which means that the roller disposed between these projections is even shorter.

It is desirable that a lawn mower be capable of being adjusted to provide different heights of cut, and to this end means are provided whereby the vertical position of the ground roller 25 relative to the projections 33a and 33b may be varied. As illustrated in the drawings, the projections 33a and 33b are each provided with vertically extending grooves 35a and 35b, respectively, for receiving therein ground roller brackets 36a and 36b, respectively. These roller brackets 36a and 36b support therein at the lower end thereof suitable bearings for the ground roller 25. Additionally, each of these roller brackets 36a and 36b is provided with a plurality of tapped spaced openings 37 along the vertical extent thereof for threaded engagement with fastening means 38 which preferably extend through suitable openings one in each of the projections 33a and 33b thereby firmly to support the roller brackets 36a and 36b in selected vertical positions thereby to secure the ground roller 25 in rotatable positon relative to the housing 22. Thus, the vertical position of the roller 25 relative to the housing 22 may be varied thereby raising or lowering the housing as the case may be.

In order to support the front portion of the housing or support 22 above the ground, there are provided a pair of side plates 38 and 39, respectively, which are integrally secured one to either side of the housing 22 adjacent the front thereof. As illustrated, the left-hand side plate is designated as 38, while the right-hand side plate is designated as 39. Actually, the side plates 38 and 39 might be integrally made with the housing 22, but, as illustrated, they are separate plates which are suitably secured thereto as by a plurality of fastening means such as 40 so as to provide upwardly extending plates at either side of the housing 22. These side plates 38 and 39 serve several functions, one of which is to provide a pivotal support for the handle assembly generally designated by the reference numeral 28.

As illustrated, the handle assembly 28 includes a lower handle portion 28a and an upper handle portion 28b, which portions are suitably secured together by means of a suitable handle brace 41. The upper handle assembly 28b comprises a pair of L-shaped tubular members with the long arms of the L's extending toward the lower handle assembly 28a, while the short arms of the L's extend generally laterally to provide a sort of handle bar arrangement to which may be attached suitable handle grips 42. Preferably, the L-shaped members comprising the upper handle assembly 28b are brazed together adjacent the upper end, as indicated at 43, so that the upper handle assembly 28b, when united with the lower handle assembly 28a, provides a rigid handle structure. The lower handle assembly 28a comprises a pair of tubular members which are bent to provide a sort of diverging construction when secured to the upper handle assembly 28b by the brace 41. The lower ends of the tubular members of the lower handle assembly 28a are spaced apart a distance slightly greater than the spacing between the side plates 38 and 39.

For the purpose of pivotally supporting the handle assembly 28 from the side plates 38 and 39, the former includes a pair of pivot members 47 and 48, preferably formed of a malleable cast iron or the like, each including tubular portions 47a and 48a, respectively, for receiving therein the corresponding ends of the tubular members defining the lower handle assembly 28a. The pivot members 47 and 48 are united to the lower handle assembly 28a to form an integral handle assembly. The pivot members 47 and 48 also include portions 47b and 48b, respectively, each comprising a flat platelike portion so as to be disposed in parallel relationship with the vertically disposed side plates 38 and 39, respectively. The handle pivot member 47 is provided with an integral laterally extending pivot pin 50, while the handle pivot member 48 is similarly provided with an integral laterally extending pivot pin 51. These pivot pins 50 and 51 defining a pivotal axis for the handle assembly 28 are provided with enlarged shoulder portions to insure a predetermined spacing between the handle pivots 47 and 48 and the side plates 38 and 39, respectively.

In order to permit selective adjustment of the height of cut of the mower 20, the pivot pins 50 and 51 are adapted to extend through one of a plurality of openings 53 provided in each of the side plates 38 and 39. These openings 53 in each side plate are spaced from each other and arranged in a generally vertical direction along somewhat of a curved line in a manner which will be described in greater detail hereinafter. Preferably a cotter key 54 or the like serves to hold the pivot pins 50 and 51 in engagement with the selected one of the openings 53 in each of the side plates 38 and 39, respectively. It will be apparent that by removing the cotter key 54 the pivot pins 50 and 51 may be moved to any others of the openings 53, it being understood that the pivot pins 50 and 51 will be put in corresponding openings 53 in the respective side plates 38 and 39, and, additionally, the vertical position of the ground roller 25 will be correlated with the relative positions of the pivot pins 50 and 51 in the openings 53 to maintain the carriage 21 substantially level for any selected height of cut. To this end there is provided for each corresponding opening 37 in roller brackets 36a and 36b a corresponding opening 53 in each side plate 38 and 39.

Extending laterally from each of the handle pivots 47 and 48 in a direction opposite to that of the respective pivot pins 50 and 51 are wheel-supporting axles 55 and 56, respectively, defining the axes of the ground wheels for suitably supporting the ground wheels 23 and 24, as best shown in Fig. 8 of the drawings. The axles 55 and 56 are displaced from the pivot pins 50 and 51, respectively, by a distance of between two and three inches for an embodiment employing ten-inch ground wheels. It will be apparent that the ground wheels 23 and 24 may have any suitable configuration. Preferably they comprise a disk wheel such as 58, having disposed on the periphery thereof a suitable semipneumatic tire 59. A suitable hub cap 60 may be provided to improve the appearance of each ground wheel and to afford access to the axle for removal of the ground wheel, inspection of the bearings, or any other purpose.

With the arrangement described thus far, it will be apparent that for any particular position of the pivot pins 50 and 51 with respect to the openings 53 the handle assembly 28 is pivotal about a horizontal axis extending through the pivot pins 50 and 51 relative to the support or housing 22, with the result that limited relative movement between the ground wheels 23 and 24 and the housing 22 occurs by pivotal movement of the handle assembly 28. Since the axles 55 and 56 are below the pivot pins 50 and 51 as viewed in the drawings, the axles 55 and 56 will move along the arc of a circle whose center is the horizontal pivotal aixs of the handle assembly 28. For small angles of pivotal movement, this movement is substantially along a horizontal plane. For the purpose of limiting the maximum pivotal movement of the handle assembly 28 relative to the housing 22, there are provided on each side plate 38 and 39 a pair of stops designated as 61 and 62, respectively. The stops 61 which are integrally secured one to the upper portion of each of the side plates 38 and 39 project into the path of movement of the pivots 47 and 48, thereby limiting the maximum counterclockwise rotation thereof, as viewed in Figs. 5, 6 and 7 of the drawings. Similarly, the stops 62 are disposed near the lower portions of the side plates 38 and 39 and project into the path of movement of the lower portions of the pivots 47 and 48, respectively, to limit the maximum clockwise rotation of the handle assembly 28, as viewed in Figs. 5, 6 and 7 of the drawings.

Figure 3:
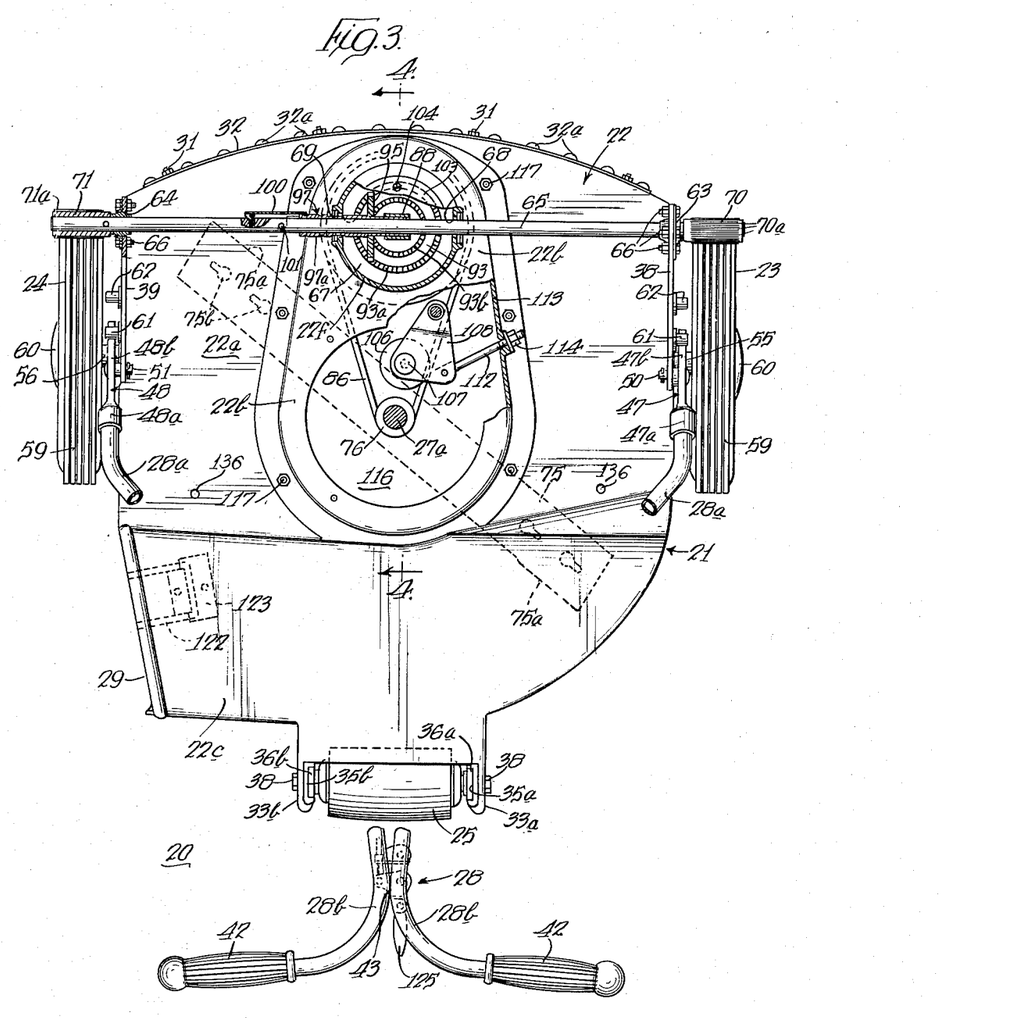
Fig. 3 is an enlarged top plan view of the lawn mower of Fig. 1, with certain portions thereof cut away better to illustrate the details of the present invention.
Figure 4:
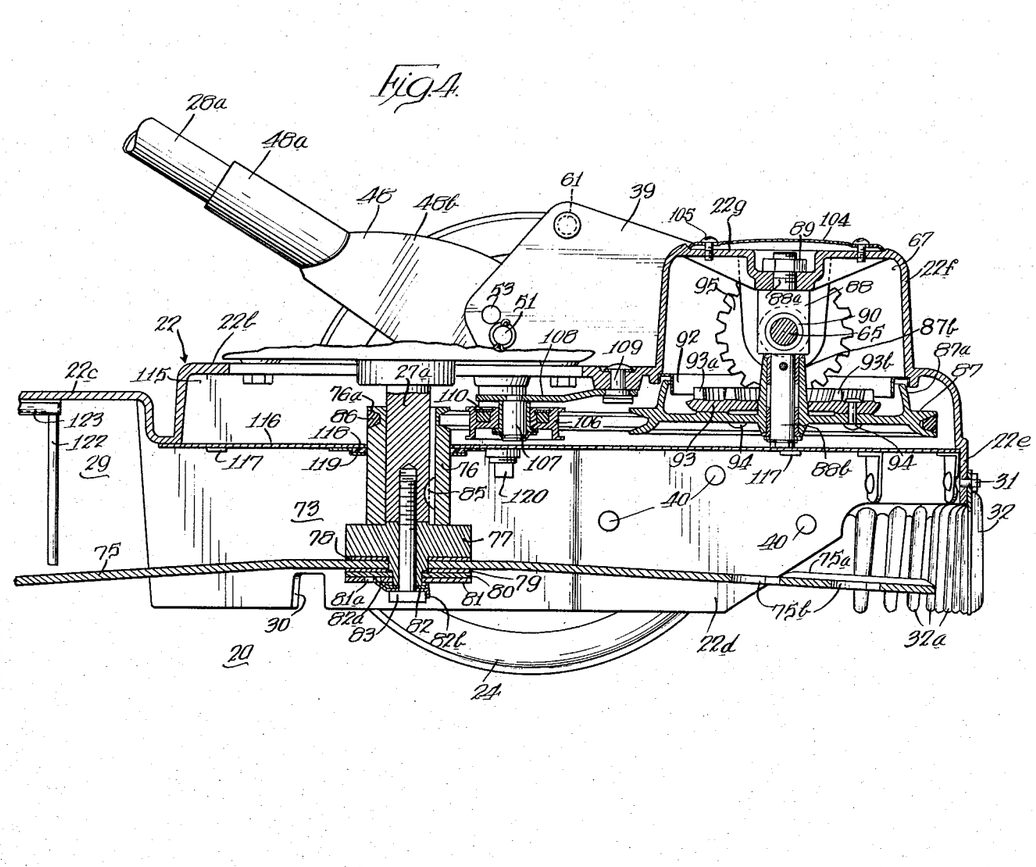
Fig. 4 is an enlarged sectional view taken on line 4—4 of Fig. 3, assuming that Fig. 3 shows the complete structure, and with certain portions cut away better to illustrate the details of the present invention.

In the copending Jepson application, Serial No. 464,020, filed October 22, 1954, now Patent No. 2,886,934, referred to above, there is disclosed a lawn mower in which there is provided a horizontally disposed jack shaft driven from the prime mover, to the ends of which shaft are attached suitable friction drive members for making frictional engagement with the ground wheels of the mower, and specifically the rubber tires associated with such ground wheels. With this arrangement a sort of freewheeling is provided whereby the horizontal jack shaft may effectively be moved into frictional driving engagement with the ground wheels when desired. The same free-wheeling arrangement is employed in the lawn mower 20 of the present invention, and to this end the side plates 38 and 39 near the upper forward portions thereof support suitable bearings designated as 63 and 64, respectively. The bearing supported by the side plate 38 is designated as 63, while the bearing supported by the side plate 39 is designated as 64. These bearings 63 and 64 are positioned to rotatably support a suitable jack or drive shaft 65 whose axis of rotation is on a horizontal plane and which shaft 65 extends across the housing 22 in front of the axes of the ground wheels 23 and 24. Thus the axis of rotation of said jack shaft is fixed relative to the housing or platform 22. As illustrated in the drawings, the bearings 63 and 64 are fastened to the side plates 38 and 39 by suitable fastening means 66 for a purpose which will become apparent as the following description proceeds. The central portion of the jack shaft 65 extends through a cylindrical housing 22f preferably formed as an integral portion of the housing 22. This cylindrical housing 22f defining a gear chamber 67 therein, as best shown in Figs. 3 and 4 of the drawings, is provided with aligned openings 68 and 69 on either side thereof to receive the jack shaft 65. These openings 68 and 69 of course are also aligned with the bearings 63 and 64.

Figure 5:
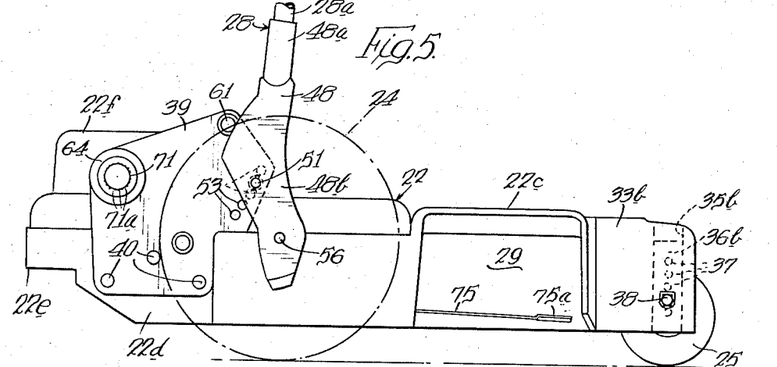
Fig. 5 is an enlarged somewhat schematic side view of a portion of Fig. 1 showing the means for applying power to the wheels in the freewheeling position.
Figure 6:
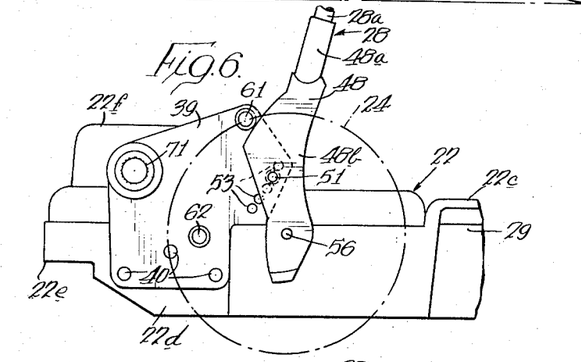
Fig. 6 is a partial view similar to Fig. 5 showing an intermediate position of the means for applying propelling power to the ground wheels of the mower.
Figure 7:
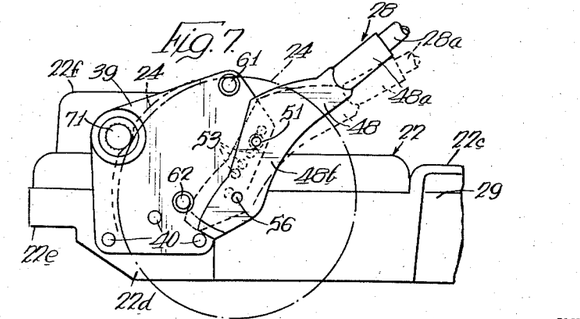
Fig. 7 is a view similar to Fig. 6 showing the position of the parts when power is applied to the ground wheels.

In order that the jack shaft 65 may be used to drive the ground wheels 23 and 24, the ends of the jack shaft 65 extend beyond the side or bearing plates 38 and 39, and secured to these ends outboard of said bearing plates are suitable ground wheel driving means or friction drive rollers 70 and 71, respectively, the drive roller 70 being disposed to make frictional driving engagement with the tire 59 of the ground wheel 23, while the drive roller 71 is disposed to make driving connection with the tire 59 associated with ground wheel 24. These drive rollers 70 and 71 are suitably keyed or otherwise secured to the ends of the jack shaft 65 so as to be rotatable about the axis of said jack shaft 65, and preferably are provided with equally spaced ridges or flutes 70a and 71a, respectively, to insure proper frictional engagement. It will be apparent that, as above described, the jack shaft 65 is, except for rotation about the longitudinal axis thereof, fixed in position relative to the housing 22. However, the change in axial spacing between friction drive rollers 70 and 71 and the ground wheels 23 and 24, respectively, is produced by virtue of pivotal movement of the handle assembly about its pivotal axis. As shown in Fig. 5 of the drawings, when the handle assembly 28 engages the stops 61, the drive rollers 70 and 71 are spaced from the periphery of the ground wheels 23 and 24 at a maximum distance. Fig. 6 shows the dead center position of the handle assembly 28 with a space between stops 61 and the handle assembly. Under these conditions, the drive rollers such as 70 and 71 are somewhat closer to the periphery of the ground wheels 23 and 24 but not in driving engagement. In Fig. 7 of the drawings the relative position of the handle assembly 28 and the drive rollers such as 71 is shown in solid lines when the drive rollers are in frictional engagement with the periphery of the ground wheels 23 and 24. It will be apparent that in this position the stops 62 are not yet engaged. When the stops 62 are engaged by the handle assembly 28, the friction drive rollers such as 70 and 71 actually distort the tire 59, as is shown by the dotted line position in Fig. 7.

From the above description it will be apparent that pivotal movement of the handle assembly 28, which functions as a ground wheel drive control means, will move the ground wheels 23 and 24 into and out of frictional driving engagement with the drive rollers 70 and 71, respectively. Although in the arrangement described above relative movement between the ground wheels and the friction drive rollers is accomplished by maintaining the friction drive rollers in a fixed position relative to the housing except for rotation about the axis thereof, and the ground wheels are moved relative to the housing, it will be understood that the ground wheels could be fixed to the housing except for rotation about the ground wheel axles, and movement of the friction drive rollers towards and away from the ground wheels could be produced, as is the case in the above-mentioned copending Jepson application.

It will further be appreciated from the above description that the housing or support 22 including the prime mover 27 is pivotally supported on the pivot members 47 and 48 of the handle, which members in turn are supported on the ground wheels 23 and 24. Thus, there is provided a sort of overcenter mechanism for the weight of the support 22 and prime mover 27. In the position of the handle 28 shown in Fig. 7 of the drawings this weight biases the rollers 70 and 71 into driving engagement with the ground wheels 23 and 24. In the position of Fig. 5, on the other hand, this weight biases the handle 28 against the stops 61.

The relationship of the openings 53 to obtain selectively different heights of cut can now be appreciated. It is clear that regardless of the setting of the mower as far as the height of cut is concerned, the drive position of the handle assembly 28 should be fixed. In other words, the operator should be able to have the hand grips 42 in a certain position above the ground and this position should be the same regardless of the height of the cut. This can be accomplished if the spacing between the drive rollers 70 and 71 and the periphery of the ground wheels 23 and 24, respectively, is the same when the handle assembly 28 is in the position shown in Fig. 7 of the drawings regardless of the particular openings 53 into which the pins 50 and 51 are inserted. Accordingly, the openings 53 are then positioned along a curve such that, with the handle assembly 28 in the position of Fig. 7 of the drawings, the same axial center-to-center spacing exists between the ground wheels and the drive rollers regardless of which openings 53 are being used. This will insure that the same pivotal movement of the handle assembly 28 is required to insure driving engagement between the drive rollers 70 and 71 and the associated ground wheels 23 and 24, respectively.

Figures 10, 11, 12:
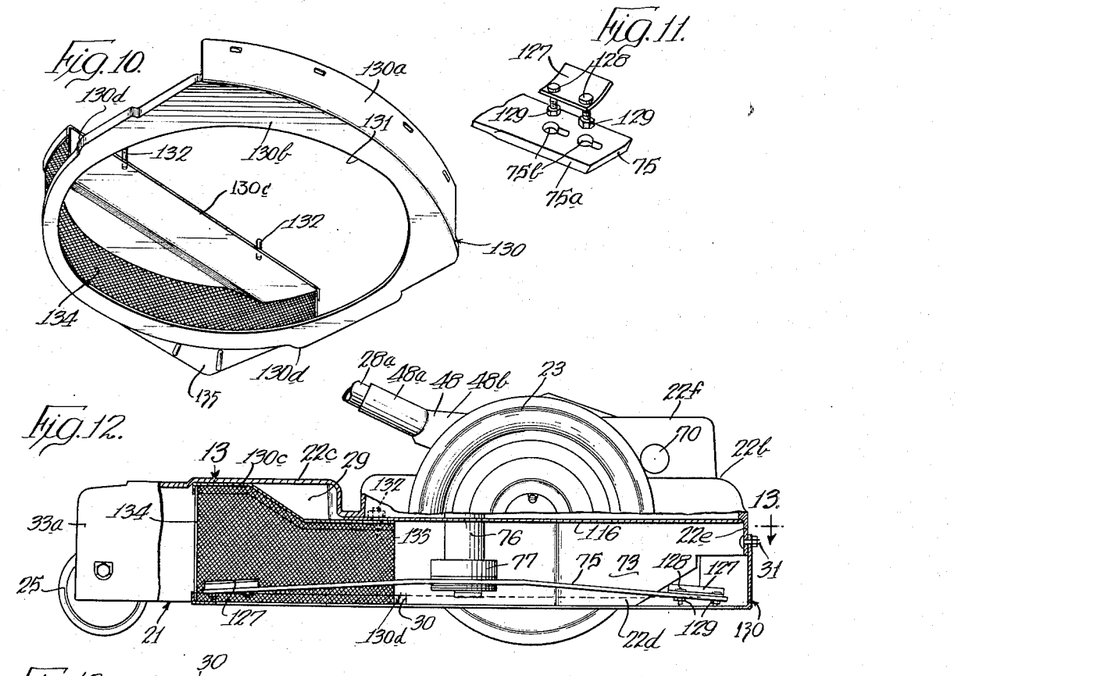
Fig. 10 is a perspective view of a mulcher attachment for the lawn mower of the present invention.
Fig. 11 is an enlarged exploded perspective view of a portion of the cutting blade of the power mower of Fig. 1, and an attachment therefor for use during a leaf mulching operation.
Fig. 12 is an enlarged sectional view through the housing of the power mower of Fig. 1, somewhat like Fig. 4, to show the mulcher attachment of Fig. 10 in position for mulching leaves.

As is well understood by those skilled in the art, a so-called rotary type lawn mower is one in which an elongated blade rotatable about a vertical axis produces the grass-cutting operation. In accordance with the present invention, the housing 22 with the depending skirt portion 22d and 22e defines a cutting chamber generally designated by the reference numeral 73. Preferably the prime mover 27, which is illustrated as an internal combustion engine of the type disclosed in Design Patent 173,072, granted September 21, 1954, has a vertical drive shaft 27a, the lower end of which extends into the cutting chamber 73, as best shown in Figs. 4 and 12 of the drawings. It should be appreciated that for a lightweight mower the prime mover 27 should be relatively light weight and should drive the cutting means directly at the normal speed of the prime mover. To this end there is suitably secured to the lower end of the shaft 27a a cutting blade 75 which has at either end thereof a suitable cutting portion 75a, the cutting portions being disposed at opposite sides of the blade and at the ends thereof so that upon rotation in a clockwise direction, as viewed in Fig. 3 of the drawings, these cutting surfaces will be effective as each end of the blade moves successively across the guard 32. The cutting surfaces 75a need be relatively short, and in a particular embodiment built in accordance with the present invention these cutting surfaces at each end of the blade are between two and three inches in length. This is because the forward motion of the mower per half revolution of the cutter blade is substantially less than the length of either cutting surface 75a.

To rigidly secure the cutting blade 75 to the shaft 27a, there is provided a motor pulley 76 and a clamping plate 77 which are preferably press fitted and brazed together to provide a unitary assembly. The pulley portion 76 is provided with a shaft opening to receive the shaft 27a to an extent until it abuts the clamping plate 77, as best shown in Fig. 4 of the drawings. To insure that the pulley 76 rotates with the engine shaft 27a, they are both preferably provided with cooperating keyways for receiving a key 85. A friction disk 78, preferably made of fiber, is then disposed between the clamping plate 77 and the blade 75. Another friction disk 79 similar to the friction disk 78 is disposed in engagement with the other side of the blade 75. A suitable washer 80 and locking members 81 and 82 are next placed in position, and the whole assembly clamped to the shaft 27a by a blade screw 83. The blade screw 83 extends through aligned openings defined in the center of the blade 75 and the members 78, 79, 80, 81 and 82, and threadedly engages a tapped opening in the shaft 27a. The locking members include a washer 81 having an opening 81a therein for receiving a locking finger 82a of the locking tab 82. The locking tab 82 also includes another finger 82b engageable with the head of the blade screw 83. Thus, when the blade screw 83 is in clamping position, the blade 75 is rigidly secured to the shaft 27a for rotation at the same speed as the shaft 27a.

In order to apply power from the prime mover 27 to the jack shaft 65 supporting the friction drive rollers 70 and 71, there is provided in accordance with the present invention the motor pulley 76 referred to above. This pulley 76 is illustrated as having defined therein a suitable V groove 76a for accommodating a belt 86 drivingly connected to a pulley 87 rotatably mounted about an axis of rotation generally concentric with the axis of the cylindrical housing portion 22f. The pulley 87 is provided with a suitable V groove to receive the belt 86. For the purpose of supporting the pulley 87 for rotation about the axis of the cylindrical housing 22f, as best indicated in Fig. 4 of the drawings, there is provided a bearing block 88 which has an upper threaded portion 88a of reduced cross section extending through an opening at the center of a cover portion 22g integrally formed with the cylindrical housing portion 22f. A suitable nut 89 holds the bearing block 88 in fixed position. This bearing block 88 is illustrated as including a cylindrical stationary shaft portion 88b extending downwardly in a vertical direction for rotatably supporting thereon the pulley 87. Additionally, the bearing block 88 includes a central portion for receiving a center bearing member 90 for the jack shaft 65. Thus, the central portion of the jack shaft 65 is supported by the bearing member 90, which in turn is supported in the bearing block 88 depending from the integral cover portion 22g of the cylindrical chamber 22f defining therein a gear chamber 67. The pulley 87 is provided with an annular upwardly extending flange 87a which cooperates with an oil shield 92 supported within the cylindrical housing section 22f.

Figures 2, 9:
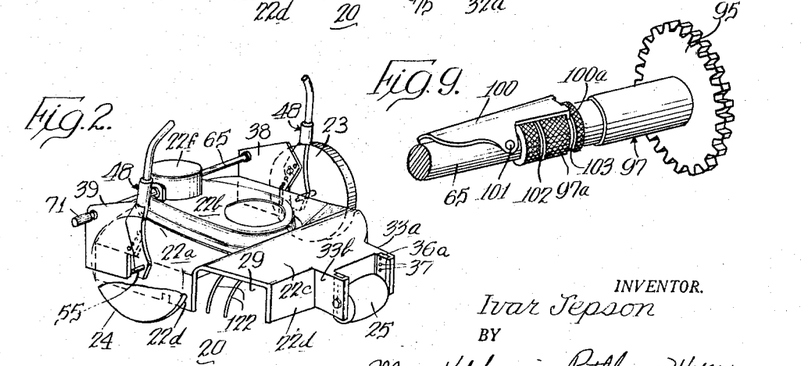
Fig. 2 is a small rear perspective view of a portion of the lawn mower of Fig. 1, somewhat schematic in nature, showing the lawn mower in the freewheeling or no-drive position.
Fig. 9 is an enlarged perspective view of a portion of Fig. 3 but with the speed change means shown in the high speed position.

In order to drive the jack shaft 65 from the pulley 87, there is provided a face gear 93 suitably secured as by fastening means 94 to the upper face of the pulley 87. The pulley 87 has an elongated hub 87b defining a rotatable shaftlike member or a vertical jackshaft, a portion of which extends below the frame or platform portion 22b of the mower 20 and a portion of which extends above this frame. Thus the pulley 87, the gear 93 and the shaftlike member or vertical jackshaft 87b are joined as a unit so that pulley 87 is effectively disposed on said shaftlike member 87b. The face gear 93, as best shown in Fig. 3 of the drawings, is a two-speed gear and is provided with two concentric rings of gear teeth 93a and 93b, respectively, adapted to make driving engagement with a jack shaft gear 95. Preferably, the face gear 93 is forged to have the proper face gear configuration. To provide selective two-speed operation, the jack shaft gear 95 is secured to a jack shaft speed changer bushing 97 which comprises a sort of sleevelike member surrounding the jack shaft 65 and movable along the longitudinal axis thereof. Actually, the speed changer bushing 97 is partially disposed within the chamber 67 and partially disposed outside this chamber. Moreover, although the speed changer bushing 97 is movable to a limited extent along the longitudinal axis of the jack shaft 65, it is suitably keyed thereto so that rotation of the speed changer bushing 97 will result in rotation of the jack shaft 65. It will be appreciated that the jack shaft gear 95 secured to the speed changer bushing 97 is capable of making driving engagement either with the face gear portion 93a or the face gear portion 93b of the face gear 93. With this arrangement there is provided a selective transmission providing two-speed rotation of the jack shaft 65 depending upon the position of the speed changer bushing 97. Moreover, the gear 95 defines driving structure for said mower 20 mounted above the frame or carriage operatively connected to the unit comprising elements 87, 93 and 87b. Preferably, and as best shown in Fig. 9 of the drawings, the speed changer bushing 97 is provided with a knurled section 97a extending outside the housing portion 22f so that it can be manually grasped by the operator. A suitable pivotal latch member 100 pivotally mounted as at 101 to the jack shaft 65 is provided with a latch portion 100a selectively engageable in one of two circumferential grooves 102 and 103 defined in the knurled portion 97a of the speed changer bushing 97. When the latch portion 100a of the latch member 100 engages the groove 102, the jack shaft gear 95 meshes with the gear teeth 93b of the face gear 93, thus providing a slow speed rotation of the jack shaft 65, and, hence, a slow speed forward movement of the mower when the friction drive rollers 70 and 71 are moved into driving engagement with the ground wheels 23 and 24, respectively. On the other hand, when the latch portion 100a of the latch member 100 engages the groove 103, the speed changer bushing 97 is positioned so that the jack shaft gear 95 is in driving engagement with the gear teeth 93a of the face gear 93, which is the high speed drive and which provides a forward movement of the mower of the order of three miles per hour.

For the purpose of lubricating the gears 93 and 95, the chamber 67 is preferably supplied with a suitable lubricant which is prevented, by virtue of the oil shield 92 and cooperating portion 87a of the pulley 87, from escaping from chamber 67. Preferably there is an opening (not shown) defined in the cover portion 22g of the housing section 22f to afford access to the bearing block 88 and also to supply the necessary lubricant to the chamber 67. A suitable cover 104 to close such opening may be provided for the top of the housing section 22f and secured thereto by fastening means 105. This cover will close the access opening to the chamber 67 not shown in the drawings, and will provide a pleasing appearance for the top of this housing. Any suitable indicia may be supplied to this cover with regard to directions or other information.

It will be appreciated that belt tightening means are desirable for the V belt 86 which should be capable of adjustment without taking the mower apart, and which can be accomplished in a simple manner. To this end there is provided an idler pulley 106 rotatably mounted to a stub shaft 107 fixedly secured to an idler plate 108. This idler plate 108 is pivotally supported within the housing 22 as by a pivot member 109. The idler pulley 106 is preferably self-lubricating including a lubricating pad 110 which feeds lubricant to the idler pulley bearing in a manner well understood by those skilled in the art. In order that the idler pulley may be adjusted to insure proper tension of the belt 86, the idler pulley pivot plate 108 is connected to the housing 22 by means of an adjusting screw 112 (Fig. 3) extending through the vertical wall 113 defining the boundary between the raised portion 22b and the portion 22a of the housing 22. A suitable nut 114 on the end of the adjusting screw 112 extending outside the housing 22 will readily permit the operator to tighten or loosen the belt 86.

With the arrangement described, it will be apparent that the pulley 76, the pulley 87, the belt 86 and the idler pulley 106 will be within the cutting chamber 73 and subject to engagement with grass cuttings, leaf mulch and the like. Preferably, there is provided a sealed chamber designated at 115 above the chamber 73 to accommodate the belt and pulleys and the like. This chamber 115 is defined by the housing 22 and a cover member 116 suitably secured as by fastening means 117 to the housing 22. This cover 116 is provided with an opening to accommodate the pulley 76, but a suitable felt dust shield 118 is preferably provided around the pulley 76 held in place by a dust shield cover 119. If desired, a suitable drain plug 120 may be accessible within the cutting chamber 73, which drain plug may be connected to the prime mover to drain oil or the like therefrom.

In order to prevent the operator or someone else from inadvertently inserting a foreign object, or, for example, the operator's shoe, into the opening 29 defining the exhaust chute for the cuttings and mulched material, there is preferably provided a foot guard 122 which is pivotally mounted within the chute defined by the housing portion 22c by a foot guard bracket 123. Preferably, the foot guard may be pivoted outwardly, but is prevented from moving inwardly thereby obstructing an object from moving into the chute and into possible engagement with the rotatable cutting blade 75.

In view of the detailed description included above, the operation of the rotary lawn mower 20 of the present invention will readily be understood by those skilled in the art. The blade 75 is rotated at the speed of the prime mover shaft 27a, thus insuring efficient cutting operation. The jack shaft 65, depending upon the position of the speed changer bushing 97, may be selectively driven either at a high speed or a low speed. Moreover, by simple pivotal movement of the handle the mower may be driven forwardly at either one of two speeds when the friction drive rollers 70 and 71 engage the ground wheels. The mower 20 may also be operated in the so-called freewheeling manner as if no power were applied to the drive wheels by merely raising the handle assembly 28. No complicated clutch mechanism is necessary, and simple pivotal movement of the handle applies or removes power from the ground wheels. To give the operator control of the prime mover 27, a throttle lever 125 is mounted adjacent the handle grips 42, which throttle lever is connected by a suitable Bowden wire 126 with the prime mover 27 in a well understood manner.

Figure 13:
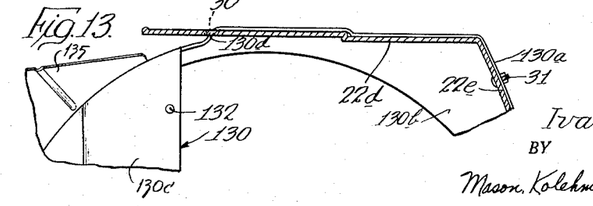
Fig. 13 is an enlarged partial sectional view taken on line 13—13 of Fig. 12, assuming that Fig. 12 shows the complete structure, but omitting everything except the mulcher and mower frame to which it is attached.

In the event that the lawn mower 20 is desired to be used as a leaf mulcher, the selective speed changer bushing 97 is moved to the slow speed operating position of the jack shaft 65, and the front guard 32 is removed. In addition, suitable mulching wings 127 are secured to the ends of the cutting blade 75, as best shown in Figs. 11 and 12 of the drawings. Preferably the blade 75 is provided with suitable openings 75b adjacent the ends thereof to accommodate suitable mulching wing studs 128 whereby the mulching wings 127 may be clamped to the blade ends by the studs 128 and suitable nuts 129. These wings produce a sort of fan action and assist in breaking up leaves and the like within the cutting chamber 73. In addition, a mulcher attachment, generally designated by the reference numeral 130, is secured to the bottom of the housing 22 in the manner best shown in Figs. 12 and 13 of the drawings. Essentially, the mulcher attachment 130, best shown in Fig. 10 of the drawings, includes an arcuate forward portion 130a which corresponds to the guard 32 and is fastened to the housing 22 by the same fastening means 31 which held the guard 32 in position. The mulcher attachment 130 includes a lower horizontal portion 130b defining a circular opening 131 therein, and furthermore defining an annular ledge around the opening 131 within the cutting chamber 73. The rear of the mulcher attachment 130 is provided with an imperforate top portion 130c which is raised toward the rear, as best shown in Fig. 12, to engage the inner wall of the housing section 22c. This imperforate section 130c is provided with integral studs 132 which extend through suitable openings 136 (Fig. 3) defined in the housing thereby to receive nuts 133 and hold the rear portion of the mulcher attachment 130 in position. A suitable screen section 134 encloses the rear open surface of the mulching section, as best shown in Figs. 10 and 12 of the drawing, and it will be apparent that the leaves and grass are reduced to a fine pulverized state in being forced through the screen section 134, whereupon the material may pass out of the opening 29 in the chute section of the mower. Preferably the mulcher attachment 130 includes a lateral extension 135 adjacent the opening 29 to guide the mulched leaves, etc. outside the housing 22. The mulcher attachment 130 further includes a narrow upwardly extending rim portion 130d on the sides thereof, which upwardly extending portion engages the notches 30 described heretofore, thus firmly supporting the mulcher in position.

From the above description it will be apparent that the lawn mower 20 of the present invention can readily be converted from a mower to a leaf mulcher in a minimum of time. All that is necessary is to replace the guard 32 with the mulcher arrangement 130.

While a particular embodiment of the invention has been shown, it will be understood, of course, that the invention is not limited thereto, since many modifications may be made, and it is, therefore, contemplated by the appended claims to cover any such modifications as fall within the true spirit and scope of the invention.

What is claimed as new and desired to be secured by Letters Patent of the United States is:

1. In a lawn mower, a movable platform, ground wheels supporting said platform, a prime mover mounted upon said platform having a first vertical shaft extending beneath said platform, a cutter blade connected to said shaft beneath said platform, a housing mounted on said platform, a drive shaft supported for rotation above said platform extending through said housing and disposed in parallel relationship with the axes of said ground wheels, friction drive members on the ends of said drive shaft for frictionally engaging the periphery of said ground wheels, means producing relative movement between said friction drive members and said ground wheels between "drive" and "no-drive" positions thereof, and driving means interconnecting said first vertical shaft and said drive shaft including speed change means disposed within said housing for producing at least two different speeds of said drive shaft.

2. The lawn mower of claim 1 wherein said drive shaft is rotatable in fixed bearings on said platform and the axes of said wheels are movable toward said drive shaft.

3. The lawn mower of claim 1 wherein said speed change means comprises a face gear including two concentric rings of gear teeth and a third gear connected to said drive shaft and selectively engageable with one or the other of said two concentric rings of gear teeth.

4. The rotary type lawn mower of claim 1 wherein said speed change means comprises a face gear rotatable with a second vertical shaft driven by said first vertical shaft and having two concentric circles of gear teeth thereon surrounding said second vertical shaft, and a gear concentric with said drive shaft and movable to a limited extent along said drive shaft intermediate said friction drive members, said concentric gear being movable between a first position in driving engagement with the gear teeth of one circle of said face gear and a second position in driving engagement with the gear teeth of the other circle of said face gear.

5. A lawn mower of the rotary type comprising a pair of ground wheels, a carriage carried by said ground wheels, a prime mover mounted on said carriage, a cutting element rotatably mounted on said carriage and directly connected to said prime mover, handle means pivotally connected to said carriage, stop members limiting the extreme pivotal movements of said handle means relative to said carriage, an over center mechanism disposed between said handle means and said ground wheels dependent upon the weight of said carriage to cause said handle means to move toward either one or the other of its extreme positions, a rotatable shaft supported for rotation by said carriage and disposed in spaced parallel relationship with the axes of said ground wheels, said handle means being pivotal about an axis displaced by a predetermined amount from the axes of said ground wheels whereby pivotal movement of said handle means causes the axes of said ground wheels to move toward and away from said shaft, means driving said shaft from said prime mover, and friction drive members rotatable with said shaft and engageable with said ground wheels to drive the latter in the lower position of said handle means relative to said support means.

6. In a lawn mower, the combination of a movable platform, cutting means effectively supported by said platform, a prime mover mounted upon said platform and drivingly connected to said cutting means, a pair of side plates rigidly secured one to each side of said platform and extending above said platform, a shaft journalled in said side plates and extending across said platform, a handle for said mower, a pair of ground wheels having their axles supported by said handle, means defining a plurality of openings in each of said side plates with said openings in each side plate arranged along a curve extending in a generally vertical direction, pivot means pivotally connecting said handle with the corresponding one of said openings in each of said side plates and with the axis of said pivot means displaced from the axes of rotation of said ground wheels whereby pivotal movement of said handle causes said ground wheels to move toward and away from said shaft, friction drive rollers on said shaft engageable with the peripheries of said ground wheels in a predetermined position of said handle, and means drivingly interconnecting said shaft and said prime mover, said pivot means being selectively related with different corresponding openings in said side plates to vary the height of said platform and hence determine the height of cut of said lawn mower, the curve along which said openings are arranged being such that regardless of the openings with which said pivot means are associated said handle will be in said predetermined position when said drive rollers engage in the peripheries of said ground wheels.

7. The lawn mower of claim 6 wherein said prime mover is provided with a vertical shaft extending beneath said platform and said cutting means comprises a blade secured to the end of said vertical shaft extending beneath said platform.

8. The lawn mower of claim 6 wherein a short vertically adjustable ground roller supports the rear of said platform.

9. A power lawn mower comprising a platform, a prime mover mounted upon said platform, cutting means drivingly connected to said prime mover, a pair of side plates rigidly secured one to each side of said platform and extending above said platform, a shaft journalled in said side plates and extending across said platform with the ends projecting beyond said side plates, means driving said shaft from said prime mover, a handle for said mower comprising a diverging construction receiving said side plates therebetween, pivot means relating said handle to said side plates, a pair of ground wheels each supported on an independent axle extending outwardly from either portion of said diverging construction beyond said pivot means for supporting said platform through said handle and side plates, friction drive rollers secured to the ends of said shaft and extending over said ground wheels, said drive rollers being engageable with the peripheries of said ground wheels in response to predetermined pivotal movement of said handle for driving said ground wheels from said prime mover.

10. In a combination mower and mulcher, a carriage defining a housing open at the bottom, ground wheels for supporting said carriage, a prime mover including a vertical shaft supported on said carriage with one end of said shaft extending into said housing, a cutter blade within said housing secured to the end of said shaft, said blade having cutting portions at either end thereof, a pair of upwardly directed mulching wings secured one to either end of said blade, a mulching attachment comprising a removable unit disposed within said housing and secured thereto, said attachment including means defining a downwardly directed circular opening having an annular ledge surrounding said opening, said removable attachment including an imperforate top over a portion of the rear of said attachment, said imperforate top being disposed adjacent one wall of said housing, and a perforate rear end on said attachment through which cuttings and leaves are forced.

11. In a lawn mower, a movable platform, ground wheels supporting said platform and movably connected thereto, a prime mover mounted upon said platform having a vertical shaft extending beneath said platform, a cutter blade connected to said shaft beneath said platform, a drive shaft supported for rotation by said platform and disposed in parallel relationship with the axes of said ground wheels, the axis of said drive shaft being fixed relative to said platform, friction drive members on the ends of said drive shaft for frictionally engaging the periphery of said ground wheels, means moving said ground wheels into driving engagement with said friction drive members, and driving means separate and distinct from the driving connection between said prime mover and said cutter blade interconnecting said vertical shaft and said drive shaft, said drive shaft serving to transmit power solely from said prime mover to said ground wheels.

12. In a lawn mower, the combination of a movable platform, cutting means effectively supported by said platform, a prime mover mounted upon said platform and drivingly connected to said cutting means, a pair of plates rigidly related to said platform one on either side thereof, a handle including a portion disposed adjacent each side plate, a pair of ground wheels having their axles supported one by each of said handle portions, and pivot means pivotally connecting each of said handle portions to a corresponding one of said side plates for supporting said platform on said ground wheels, the pivotal axis of said pivot means being displaced relative to the axis of rotation of said ground wheels.

13. The lawn mower of claim 12 wherein a shaft is journaled in said side plates and extends across said platform, said shaft having friction drive rollers connected thereto for frictionally driving said ground wheels in response to a predetermined movement of said handle about said pivotal axis.

14. The lawn mower of claim 11 wherein said driving means is disposed beneath said platform, and means defining a sealed chamber enclosing said driving means is provided.

15. For use with a power lawn mower comprising a carriage, a prime mover supported on said carriage and cutting means rotatably mounted on said carriage, the combination of driving means for propelling said mower operatively connected to said prime mover including a rotatable drive member, means on said carriage defining a lubricant chamber substantially closed at one side by said drive member, and an annular flange extending from one face of said rotatable drive member and cooperating with said chamber defining means for retaining lubricant in said chamber.

16. A lawn mower comprising a carriage, a prime mover mounted on said carriage, a cutting element supported by said carriage and driven by said prime mover, a pair of pivotal members connected to opposite sides of said carriage for pivotal movement about a first horizontal axis, bifurcated handle means connected to said pivotal members and extending upwardly and rearwardly from said carriage, ground wheels rotatably mounted on said pivotal members so as to rotate about a second axis parallel to and spaced from said first axis, and frictional drive means connected to said prime mover and positioned adjacent the periphery of said ground wheels, said first and second axes being positioned out of vertical alignment.

17. The lawn mower of claim 16 wherein the pivotal connection between said pivotal members and said carriage is vertically adjustable while maintaining the same spacing between said first and second axes and the same angular position of said pivotal members when said frictional means are in driving engagement.

18. The lawn mower of claim 17 wherein said vertically adjustable means comprise means defining a series of spaced holes associated with said carriage and a pair of cooperating pivot pins mounted on said pivot members and selectively engageable with said holes.

19. A power driven lawn mower comprising support means, a prime mover mounted on said support means, cutting means rotatably mounted on said support means and driven by said prime mover, a pair of friction drive members mounted on spaced portions of said support means for rotation about a first axis and driven by said prime mover, a pair of ground wheels, a pair of elements rotatably supporting said pair of wheels for rotation about a second axis parallel to said first axis, structure pivotally mounting said elements to said support means for pivotal movement about one of a plurality of third axes substantially parallel to said first and second axes, and handle means pivoting said elements relative to said support means to move the peripheries of said ground wheels into engagement with said friction drive members when said handle is in a selected position, said structure including means for maintaining a substantially constant distance between said first and second axes when said handle is in said selected position and when said structure pivotally mounts said elements for movement about any one of said third axes.

20. In a lawn mower of the rotary type, the combination of support means, a pair of elements pivoted to said support means one on either side thereof, a pair of ground wheels one connected to each of said elements and each ground wheel being rotatable about a first axis, a prime mover mounted on said support means, a cutting blade rotatably mounted on said support means and directly connected to said prime mover, a rotatable shaft supported for rotation by said support means about a second axis and disposed in spaced parallel relationship with said first axis, said second axis being fixed relative to said support means, a ground wheel drive control means pivotal about a third axis generally parallel to but displaced from both said first and second axes, means interconnecting said ground wheel drive control means and at least one of said pair of elements to cause pivotal movement of said elements relative to said support means and movement of the axis of said ground wheels toward and away from said second axis upon pivotal movement of said ground wheel drive control means about said third axis, means driving said shaft from said prime mover, and friction drive members rotatable with said shaft and engageable with said ground wheels to drive the latter in one position of said ground wheel drive control means.

21. A power driven lawn mower comprising support means, a prime mover mounted on said support means having a vertically disposed output shaft, a horizontally disposed blade type cutting means rotatably mounted on said support means and driven by the output shaft of said prime mover, a pair of friction drive members rotatably mounted on said support means for rotation about a first axis and driven by said prime mover, a pair of ground wheels, a pair of elements rotatably supporting said pair of wheels for rotation about a second axis parallel to said first axis, structure pivotally mounting said elements to said support means for pivotal movement about a third axis substantially parallel to said first and second axes, and ground wheel drive control means pivoting said elements relative to said support means to move the peripheries of said ground wheels into engagement with said friction drive members when said ground wheel drive control means is in a selected position.

22. The lawn mower of claim 21 wherein the height of the cut is controlled by bodily changing the positions of said pair of elements relative to said support means.

23. The lawn mower of claim 21 wherein the height of cut is controlled by changing the position of said third axis relative to said support means.

24. The lawn mower of claim 21 wherein the spacing between said second and third axes is maintained constant when adjusting the height of cut.

25. A lawn mower comprising a carriage, a prime mover mounted on said carriage, a cutter blade mounted for rotation about an axis fixed with respect to said carriage, said cutter blade being drivingly connected to said prime mover, a horizontally disposed jack shaft mounted on said carriage and extending transversely of said carriage, said jack shaft being rotatable about an axis fixed with respect to said carriage, transmission means independent of the driving connection between said prime mover and said cutter blade drivingly connecting said prime mover and said jack shaft, ground wheel driving means mounted on said jack shaft, and a pair of ground wheels mounted to support said carriage and rotatable about an axis parallel to said jack shaft and movable with respect to said carriage, movement of said axis of rotation of said ground wheels causing said ground wheel driving means to rotate said ground wheels, said jack shaft serving to transmit power solely from said prime mover to said ground wheels.

26. In a lawn mower, a supporting frame, a pair of driving wheels rotatably and movably mounted on said frame, a prime mover mounted on said frame, driving rollers rotatably mounted on said frame and connected to be driven by said prime mover, and means operatively associated with said wheels urging said wheels into driving engagement with said rollers, said rollers acting to rotate said wheels in a direction whereby said wheels tend to move said frame in a forward direction during a mowing operation, said wheels tending to move themselves into firmer driving engagement with said driving rollers upon any increase in resistance to movement of said frame in said forward direction.

27. In a self-propelling, rotary type mower having a frame, wheels, cutting blade, and a vertical crankshaft engine mounted thereon; said cutting blade being secured to the vertical crankshaft of said engine below said frame; a vertical jackshaft secured to said frame and extending above and below said frame; a pulley on said vertical crankshaft of said engine below said frame and above said cutting blade; a pulley on said vertical jackshaft below said frame and aligned with said pulley on said engine vertical crankshaft; and a belt reeved around said pulley; said vertical jackshaft being adapted above said frame to be operatively associated with the driving structure of said rotary type mower.

28. In a self-propelling, rotary type mower having a frame, wheels, cutting blade, and a vertical crankshaft engine mounted thereon; said cutting blade being secured to the vertical crankshaft of said engine below said frame; a rotatable shaftlike member associated with said frame having its axis of rotation disposed in a vertical plane and including a portion extending below said frame and a portion extending above said frame; a pulley on said vertical crankshaft of said engine below said frame and above said cutting blade; a pulley on said shaftlike member below said frame and aligned with said pulley on said engine vertical crankshaft; a belt reeved around said pulleys; and driving structure for said rotary mower mounted above said frame and operatively connected with said rotatable shaftlike member.

29. A power driven lawn mower comprising support means, a prime mover mounted on said support means, cutting means rotatably mounted on said support means and driven by said prime mover, a pair of friction drive rollers rotatably mounted on said support means for rotation about a first axis and driven by said prime mover, a pair of ground wheels, a pair of elements rotatably supporting said pair of ground wheels for rotation about a second axis parallel to said first axis, structure pivotally mounting said elements to said support means about a third axis parallel to said first and second axes, means constantly urging pivotal movement of said elements in a predetermined direction to move the peripheries of said ground wheels into engagement with said friction drive rollers, and ground wheel drive control means on said support means movable between preselected positions for pivoting said elements in a direction opposite to said predetermined direction.

30. A self-propelled lawn mower including a frame having supporting wheels and a motor thereon drivingly connected to a cutting blade, a pair of spaced bearing plates attached at the sides of said frame, a power transmitting shaft rotatably mounted in said plates, frictional driving elements carried by said shaft, one driving element being spaced outboard of each said bearing plate, means mounting said supporting wheels for said mower on said bearing plates, said mounting means including a wheel mounting plate spaced outboard of each said bearing plate, said mounting plates being pivoted on said bearing plates to one side of said driving elements for movement of the wheels toward and away from said driving elements and for engagement with said elements, and a handle pivotally connected to said mower and extending rearwardly therefrom, said handle upon downward movement thereof causing movement of said mounting plates relative to said driving elements.

References Cited in the file of this patent

UNITED STATES PATENTS

| | | |
|---|---|---|
| 1,484,635 | Francis | Feb. 26, 1924 |
| 2,247,333 | Funk | June 24, 1941 |
| 2,359,654 | Ligh | Oct. 3, 1944 |
| 2,378,634 | Hussey | June 19, 1945 |
| 2,514,407 | May | July 11, 1950 |
| 2,521,972 | Haglund et al. | Sept. 12, 1950 |
| 2,578,880 | Doyle | Dec. 18, 1951 |
| 2,623,603 | Cutlan et al. | Dec. 30, 1952 |
| 2,659,191 | Miller et al. | Nov. 17, 1953 |
| 2,663,984 | Clark | Dec. 29, 1953 |
| 2,669,826 | Watrous | Feb. 23, 1954 |
| 2,691,421 | Swanson | Oct. 12, 1954 |
| 2,701,436 | Harnett | Feb. 8, 1955 |
| 2,702,978 | Fowler | Mar. 1, 1955 |
| 2,705,861 | Mott | Apr. 12, 1955 |
| 2,706,372 | Blydenburgh | Apr. 19, 1955 |
| 2,708,484 | Hoffman | May 17, 1955 |
| 2,718,739 | Long | Sept. 27, 1955 |
| 2,740,246 | Smith et al. | Apr. 3, 1956 |
| 2,806,339 | Whitney | Sept. 17, 1957 |